Figure 1:
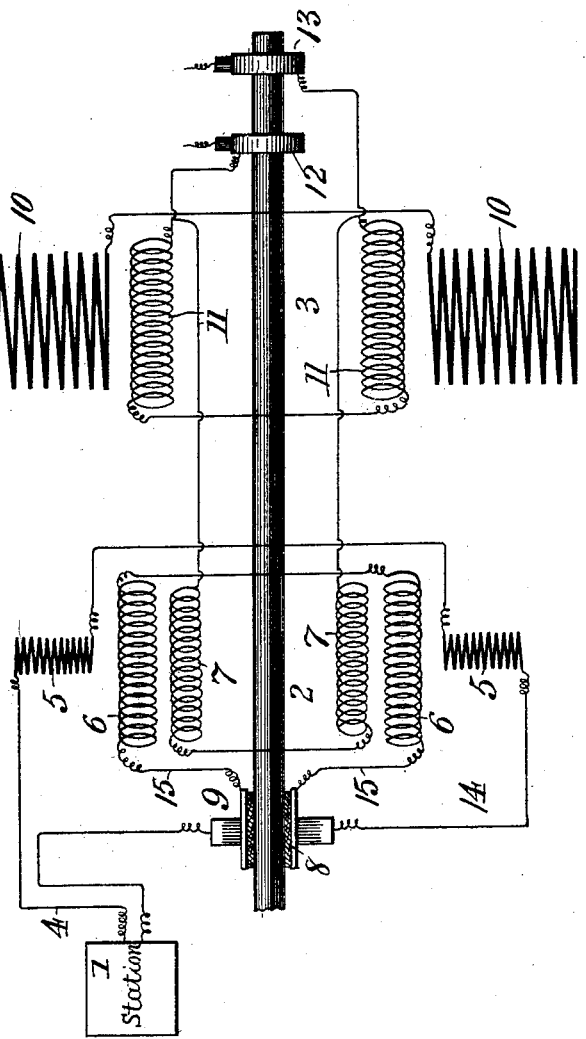

(No Model.) 2 Sheets—Sheet 1.
H. L. TYLER.
ALTERNATING CURRENT MOTOR.

No. 558,239. Patented Apr. 14, 1896.

Witnesses: Inventor:

(No Model.)  2 Sheets—Sheet 2.

H. L. TYLER.
ALTERNATING CURRENT MOTOR.

No. 558,239. Patented Apr. 14, 1896.

Witnesses:

Inventor:
Harry L. Tyler

UNITED STATES PATENT OFFICE.

HARRY L. TYLER, OF CORNING, NEW YORK.

ALTERNATING-CURRENT MOTOR.

SPECIFICATION forming part of Letters Patent No. 558,239, dated April 14, 1896.

Application filed July 19, 1894. Serial No. 518,058. (No model.)

*To all whom it may concern:*

Be it known that I, HARRY L. TYLER, a citizen of the United States, residing at Corning, in the county of Steuben and State of New York, have invented certain new and useful Improvements in Alternating-Current Motors; and I do hereby declare the following to be a full, clear, and exact description of the invention, such as will enable others skilled in the art to which it appertains to make and use the same.

The object of my invention is to provide an electric motor which, when supplied with a single-phase alternating current of the frequency usually employed for commercial electric lighting, will operate with efficiency and simplicity as the receiving element in systems for the transmission of power.

The invention is designed to render commercially available the established fact that a simple single-phase generator will act as a motor, if means for reaching a synchronous speed are employed, and if unalternating magnetization is furnished to the motor-fields after synchronism is attained.

A continuous-current dynamo or motor may by alternating current start the alternating motor to synchronism, but it is quite a different matter to subsequently provide exciting-current for the alternating-motor field during synchronism. In order to accomplish this by the same auxiliary motor which is used for starting, as has been heretofore proposed, it is necessary to place two coils upon the fields of the starting-motor, because the coils wound to suitable resistance for the starting alternating current will not be of proper length or cross-section for the succeeding continuous current which must surround the same fields when said auxiliary motor is, as a dynamo, furnishing continuous exciting-current for the synchronous alternating motor; but this method is not practicable, because the two coils on the same field will be in inductive relation, and the transformer action occurring while the starting-coils are used is sufficient to generate a current in the adjoining coils of such high tension as to destroy them if open-circuited, while it is not allowable to short-circuit them, as they then impair the starting powers to such an extent that synchronism is too difficult to be attained; nor can this condition be overcome without placing the respective field-coils out of inductive relation, and such a step would necessarily render one or the other of them absolutely useless.

The characteristic feature of my invention consists in employing for starting and subsequent field excitation a starting and exciting motor which acts first as a starter and secondly as a revolving transformer, and entirely dispensing with the two auxiliary coils in inductive relation upon the motor-field and the destructive transformer action incident to their employment.

Figure 2:
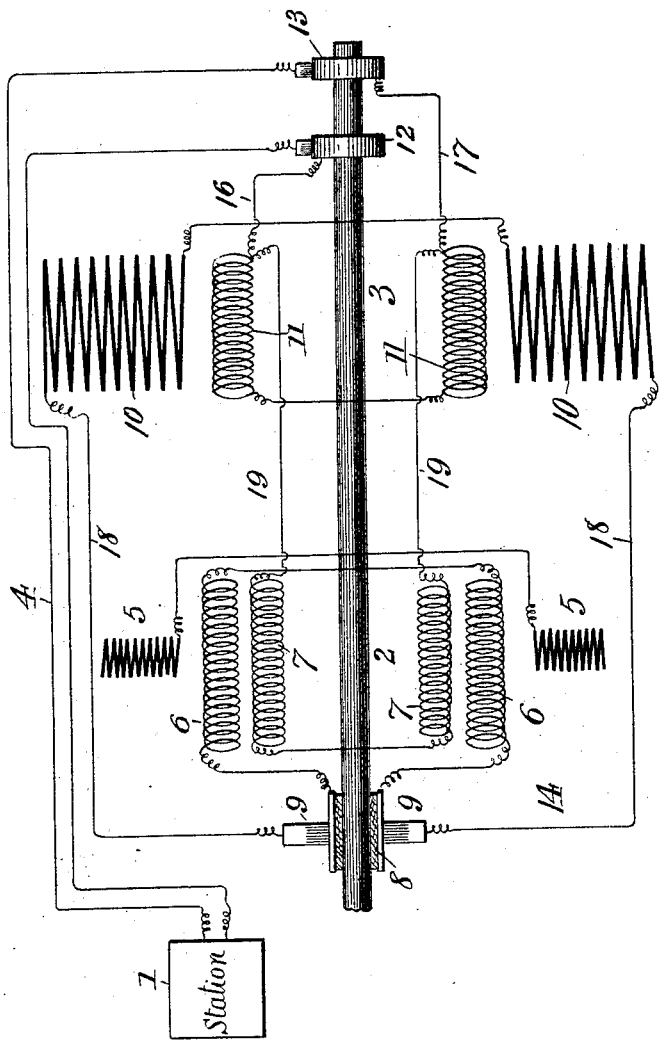

In the accompanying drawings, illustrative of my invention, Figure 1 represents, diagrammatically, the relation of the circuits during the starting operation; and Fig. 2 represents a like view after synchronism is attained.

Similar numerals of reference indicate similar parts in both views.

Referring to the drawings, 1 indicates a distant source of alternating currents; 2, the revolving transformer and starting device; 3, the synchronous motor, and 4 the main line between the motor and source. The revolving transformer and starting device is provided with the field-coils 5, armature-coils 6, and coils 7. The coils 6 and 7 are supported and held in inductive proximity upon a suitable core mounted on the armature-shaft of the synchronous motor, and the field-coils can be divided into any number of groups or windings to correspond with the number of magnetic field-poles desired.

On one end of the armature-shaft is a commutator 8, provided with brushes 9. The synchronous motor 3 is arranged alongside of the revolving transformer on the same shaft, and is provided with the field-coils 10 and armature-coils 11, the latter being in circuit severally with collector-rings 12 13 on the armature-shaft.

The connections being established, as shown in Fig. 1, the starting is effected in the usual way, the field-coils 5 and armature-coils 6 cooperating as in any motor until synchronism is reached. The coil 7 remains, of course, idle until synchronism is reached; but when the revolving parts attain synchronism and the connections are changed, as shown in Fig. 2, the starting-motor becomes a revolving transformer, the coil 7 being the primary and receiving alternating current from the line, while the coil 6 is the secondary and has induced in itself by common transformer action alternating current of the same frequency as the line. At this stage the stationary field surrounding the revolving transformer is used only to complete the magnetic circuit, the coils 5 being open-circuited and idle.

The alternating current in coil 6 is, as generated, unavailable for the desired continuous excitation of the field of the synchronous motor 3; but as said coil 6 is connected to the commutator 8, and as the whole is revolving synchronously, it necessarily follows that the transformer current of coil 6 is taken off by the brushes 9 as continuous current, which is exactly what is desired for the synchronous motor-field excitation. The continuous current from the brushes 9 is supplied to the synchronous motor-fields 10 by the connections 18.

It will be noted that the coil 7 is in multiple to the armature-coils of the synchronous motor through the intermediacy of the connections 19.

It is found in practice that while coil 7, as shown in Fig. 1, is practically short-circuited by coil 11, the latter by its self-induction opposes the influence of coil 7 to such an extent as to prevent the generation of any appreciable amount of energy at the time of starting. Where the coils are not so proportioned as to bring about this result, it might be advisable to disconnect one side of coil 7 from 11 at the time of starting.

Having thus described my invention, what I claim is—

1. In an electric transmission-of-power system, the combination of a source of supply of alternating currents, a circuit connected therewith, a synchronous electric motor, circuit connections whereby the non-synchronous motor brings the synchronous motor up to synchronism, a second coil on the armature of the non-synchronous motor and in inductive relation to the armature-coil thereof, and means whereby the alternating current is switched into the synchronous motor and said second coil, when synchronism is reached, thereby converting the non-synchronous motor into a revolving transformer; substantially as described.

2. In an electric transmission-of-power system, the combination of a source of alternating-currents generator, a circuit connected therewith, a non-synchronous electric motor, a synchronous electric motor, circuit connections whereby the non-synchronous motor brings the synchronous motor up to synchronism, means by which the alternating current is then switched into the synchronous motor, a second coil on the armature of the non-synchronous motor, said second coil being in inductive relation to the armature-coil of non-synchronous motor, means for connecting said second coil with the alternating-current-supply source when synchronous speed is reached so as to convert the non-synchronous motor into a revolving transformer, and means for maintaining said motor at synchronous speed thereafter.

3. In an electric transmission-of-power system, the combination of a source of supply of alternating currents, a circuit connected therewith, a synchronous electric motor, circuit connections whereby the non-synchronous motor brings the synchronous motor up to synchronism, a second coil on the armature of the non-synchronous motor and in inductive relation to the armature-coil thereof, and means whereby the alternating current is switched into the synchronous motor and said second coil, when synchronism is reached, thereby converting the non-synchronous motor into a revolving transformer, a commutator for the transformed current, and means for connecting said commutator to the field of the synchronous motor; substantially as described.

4. In an electric transmission-of-power system, the combination of a source of alternating currents, a circuit connected therewith, a non-synchronous motor comprising a field-magnet, armature and commutator, and means for connecting the coils of the field-magnet and armature to the alternating-current circuit in such a way that said motor is enabled to start from rest, a synchronous motor and circuit connections whereby the non-synchronous motor brings the synchronous motor up to synchronism, and a second coil on the armature of the non-synchronous motor, said second coil being in inductive relation to the armature-coil of the non-synchronous motor and adapted to be connected to the source of alternating-current supply, when synchronism is reached.

In testimony whereof I affix my signature in presence of two witnesses.

HARRY L. TYLER.

Witnesses:
F. R. HARDING,
WM. H. DE LACY.